United States Patent
Kim et al.

(10) Patent No.: US 11,254,014 B2
(45) Date of Patent: Feb. 22, 2022

(54) NON-CONTACT HANDLER AND METHOD OF HANDLING WORKPIECES USING THE SAME

(71) Applicant: ELECTRO SCIENTIFIC INDUSTRIES, INC., Portland, OR (US)

(72) Inventors: Jae Kim, Portland, OR (US); Paul Plachinda, Portland, OR (US)

(73) Assignee: Electro Scientific Industries, Inc., Beaverton, OR (US)

( * ) Notice: Subject to any disclaimer, the term of this patent is extended or adjusted under 35 U.S.C. 154(b) by 189 days.

(21) Appl. No.: 16/621,630

(22) PCT Filed: Jul. 20, 2018

(86) PCT No.: PCT/US2018/043121
§ 371 (c)(1),
(2) Date: Dec. 11, 2019

(87) PCT Pub. No.: WO2019/018786
PCT Pub. Date: Jan. 24, 2019

(65) Prior Publication Data
US 2020/0156264 A1    May 21, 2020

Related U.S. Application Data

(60) Provisional application No. 62/535,427, filed on Jul. 21, 2017.

(51) Int. Cl.
*B25J 15/06* (2006.01)
(52) U.S. Cl.
CPC ....... *B25J 15/0616* (2013.01); *B25J 15/0675* (2013.01)

(58) Field of Classification Search
CPC . B25J 15/0616; B25J 15/0675; B66C 1/0268; H01L 21/6838
(Continued)

(56) References Cited

U.S. PATENT DOCUMENTS 3,438,668 A * 4/1969 Williams .............. B66C 1/0268
                                                    294/64.3
3,523,706 A * 8/1970 Logue .................. B66C 1/0212
                                                    294/64.3
(Continued)

FOREIGN PATENT DOCUMENTS

JP      58141536 A    8/1983
JP       5948938 A    3/1984
(Continued)

OTHER PUBLICATIONS

The European Search Report dated Mar. 24, 2021 to European application No. 18834637, 7 pages.
(Continued)

*Primary Examiner* — Paul T Chin
(74) *Attorney, Agent, or Firm* — Kurt Eaton

(57) ABSTRACT

A non-contact handler includes an upper body portion and a lower body portion movably coupled to the upper body portion. The lower body portion includes a non-contact puck configured to lift an object and a plurality of containment fences extending downward from the puck. The plurality of containment fences are arranged around a periphery of the object to be lifted.

12 Claims, 3 Drawing Sheets

(58) Field of Classification Search
USPC .......................................... 294/64.3; 271/97
See application file for complete search history.

(56) References Cited

U.S. PATENT DOCUMENTS

| | | | | |
|---|---|---|---|---|
| 3,539,216 | A | * | 11/1970 | Forcier ................. B66C 1/0287 294/64.3 |
| 4,453,757 | A | * | 6/1984 | Soraoka .................. B25J 15/02 269/233 |
| 4,969,676 | A | | 11/1990 | LaMagna |
| 5,067,762 | A | * | 11/1991 | Akashi ................. B65G 47/911 294/64.3 |
| 5,077,888 | A | * | 1/1992 | Tokisue ................ B23P 19/006 29/467 |
| 5,169,196 | A | | 12/1992 | Safabakhsh |
| 6,099,056 | A | * | 8/2000 | Siniaguine .......... H01L 21/6838 294/64.3 |
| 6,152,507 | A | | 11/2000 | Pirker |
| 7,360,322 | B2 | * | 4/2008 | Iwasaka ............ H01L 21/67784 294/188 |
| 7,690,869 | B2 | * | 4/2010 | Yo ....................... H01L 21/6838 406/88 |
| 2004/0112715 | A1 | * | 6/2004 | Miyamoto .......... H01L 21/6838 198/471.1 |
| 2008/0292446 | A1 | * | 11/2008 | Caldwell ............. B65G 47/911 414/785 |
| 2015/0035302 | A1 | | 2/2015 | Ryu et al. |
| 2015/0325466 | A1 | * | 11/2015 | Wang ................. H01L 21/6875 279/3 |

FOREIGN PATENT DOCUMENTS

| | | |
|---|---|---|
| JP | 2014136263 A | 7/2014 |
| WO | WO2008087796 A1 | 7/2008 |
| WO | WO2008/102603 A1 | 8/2008 |

OTHER PUBLICATIONS

The office action dated Dec. 16, 2021 to Chinese application No. 201880043732.5, 10 pages.
The PCT/US2018/043121, international search report dated Oct. 29, 2018, 2 pages.
The PCT/US2018/043121, written opinion, 4 pages.

* cited by examiner

NON-CONTACT HANDLER AND METHOD OF HANDLING WORKPIECES USING THE SAME

CROSS-REFERENCE TO RELATED APPLICATIONS

This application is a PCT National Phase filing in the US, which claims the benefit of U.S. Provisional Application No. 62/535,427, filed Jul. 21, 2017, which is incorporated by reference in its entirety.

BACKGROUND

There are many situations in which it is desirable to handle an object while eliminating or minimizing mechanical contact with the object. This is particularly true when the physical condition of the upper surface of the object is a critical factor in the success of an operation or quality of a product. Such situations are common in industries such as commercial printing, printed circuit board manufacture, and micro-lithography, which seek to make highly precise modifications to often delicate and mechanically sensitive surfaces.

In automated or semi-automated systems for handling objects, a number of approaches are commonly used. One approach is to use mechanical methods to transport an object. In order to minimize the possible damage caused by mechanical handling, typical methods of this type have relied upon mechanisms to either reduce the amount of contact with the upper surface of the object or to reduce the mechanical impact imposed by such contact.

Another approach is to use vacuum to move and hold objects. This approach is employed because vacuum methods generally do not require extensive mechanical handling of objects to be moved, and because vacuum cups (also referred to as suction cups) are often made of relatively soft and resilient materials in order to enhance the seal they make with a surface. However, picking up an object using a vacuum still requires mechanical contact in order to establish the necessary seal with the upper surface of the object, and the physical impingement of a vacuum cup can be just as effective in marring an imaging surface as the impact of a careless hand or a mechanical gripper.

Another approach is to use non-contact (also known as "contactless") handlers of, for example, the Bernoulli- or cyclone-type. Bernoulli- and cyclone-type handler differ in their particular modes of operation, but generally discharge a flow of fluid (typically, air) to create a pressure differential between the surface of the object and a surrounding fluid medium (typically, air). Such non-contact handlers work well for handling relatively small, fragile and thin (and even perforated) objects.

While useful, a Bernoulli-type handler can throw an object laterally away from the handler, and a cyclone-type handler can spin the object away. Also, when a Bernoulli- or cyclone-type handler picks up an object, the upper surface of the object can contact the handler (e.g., due to the upward momentum of the object as it is lifted) before being thrown or spun away from the handler.

SUMMARY

In one embodiment, a non-contact handler includes an upper body portion and a lower body portion movably coupled to the upper body portion. The lower body portion includes a non-contact puck configured to lift an object and a plurality of containment fences extending downward from the puck. The plurality of containment fences are arranged around a periphery of the object to be lifted.

DETAILED DESCRIPTION

Figure 1:
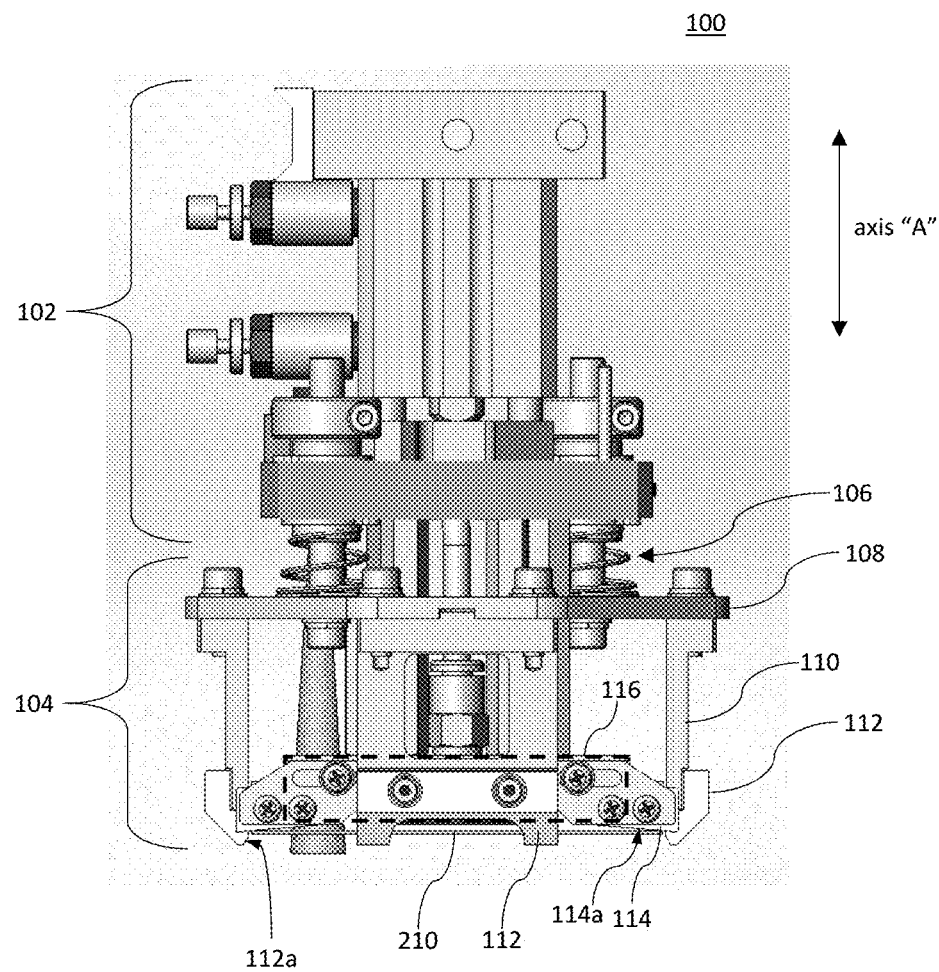
FIG. 1 illustrates a side view of a non-contact handler, according to one embodiment of the present invention.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," "approximately," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object or item may be otherwise oriented (e.g., rotated 90 degrees or at other orientations) and the spatially relative descriptors used herein may be interpreted accordingly.

Figure 2:
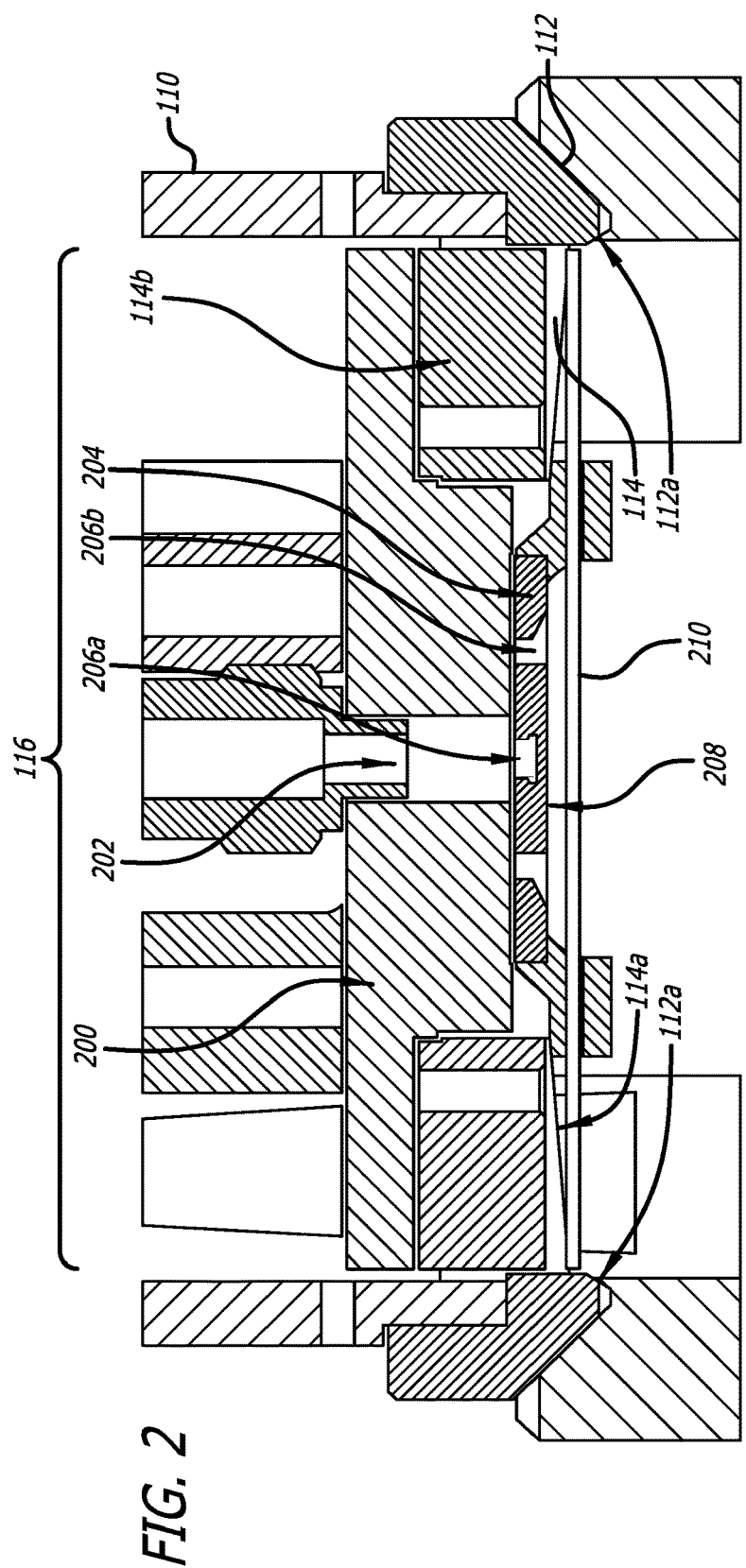
FIG. 2 illustrates a partial cross-sectional view of a lower body portion in the non-contact handler shown in FIG. 1.

FIG. 1 illustrates a side plan view of a non-contact handler according to one embodiment. FIG. 2 illustrates a partial cross-sectional view of the lower body portion shown in FIG. 1.

Referring to FIGS. 1 and 2, a non-contact handler 100 can include an upper body portion 102 and a lower body portion 104 coupled to the upper body portion by a plurality of spring-loaded pins 106. Although not illustrated, the non-contact handler 100 can also include an actuator configured to move the lower body portion 104 (e.g., along axis, A) relative to the upper body portion 102.

The upper body portion 102 is typically coupled to a robotic motion system (e.g., a Cartesian robot, a Scara robot, an articulated robot, etc.) (not shown) configured to move the non-contact handler 100. For example, the non-contact handler 100 can be moved between a cassette or magazine holding a plurality of objects (e.g., to be lifted individually) and a system configured to process one of the plurality of objects. Examples of such systems include the LT3100 and LT3110, all manufactured by ELECTRO SCIENTIFIC INDUSTRIES, INC. The aforementioned actuator of the non-contact handler 100 can be driven to raise or lower the lower body portion 104 relative to the upper body portion 102 to facilitate pick-up of an object, or release of an object from the non-contact handler 100.

The plurality of spring-loaded pins 106 are configured to prevent the lower body portion 104 from vibrating or otherwise moving undesirably during high deceleration or acceleration moves (e.g., as imparted by the robotic motion system).

The lower body portion 104 includes support plate 108, a plurality of fence supports 110, a plurality of containment fences 112 and, optionally, a plurality of workpiece supports 114 (i.e., the plurality of workpiece supports 114 can be omitted). In an alternative embodiment, however, the plurality of containment fences 112 may be omitted, provided that the non-contact handler 100 includes a plurality of the workpiece supports 114. The support plate 108 is fixed to the spring-loaded pins 106 and the plurality of fence supports 110 are fixed to the support plate 108. The plurality of containment fences 112 and workpiece supports 114 are fixed to respective ones of the fence supports 110. For example, at least one containment fence 112 and at least one workpiece support 114 can be fixed to a common fence support 110.

The lower body portion 104 also includes a non-contact puck, such as puck 116 (shown as a dashed-line rectangle), arranged between the plurality of fence supports 110. As best shown in FIG. 2, the puck 116 includes a puck body 200 through which a body passage 202 is formed, and an end effector plate 204 attached to the puck body 200.

The body passage 202 is configured to receive an outlet end of a pressurized fluid source (e.g., a hose or tube connected up to a reservoir of pressurized gas, such as air). The end effector plate 204 includes one or more effector passages extending therethrough. At least one effector passage is in fluid communication with the body passage, such that pressurized fluid (e.g., a gas such as air) can be conveyed from the outlet end of the pressurized fluid source, through the body passage 202, and into the effector passage(s) formed in the end effector plate 204. In the illustrated embodiment, the end effector plate 204 includes a single effector passage that includes a first portion 206a and a second portion 206b, The first portion 206a of the effector passage is aligned with the body passage 202 so as to directly receive pressurized fluid conveyed through the body passage 202. Although not illustrated, the second portion 206b is in fluid communication with the first portion 206a, as is known in the art (e.g., out of the plane of the cross-sectional view shown in FIG. 2). Generally, and as is known in the art, the second portion 206b extends to an effector surface 208 of the end effector plate 204, and is configured to discharge a flow of fluid (typically, air) from the end effector plate 204 to create a pressure differential between the surface of an object 210 and a surrounding fluid medium (typically, air) external to the end effector plate 204 and the object 210. Accordingly, the effector passage may be configured to discharge a flow of fluid in the same manner as conventional Bernoulli- or cyclone-type handlers.

The object 210 may be provided as a ceramic substrate, a surface-mount device (SMD) circuit board, etc., which may or may not be perforated. If provided as a ceramic substrate, a surface-mount device (SMD) circuit board, or the like, the upper surface of the object 210 (e.g., as illustrated in FIG. 2) support devices such as thin-film resistors, thick-film resistors, SMD resistors, or the like, or any combination thereof.

When the object 210 is brought into operable proximity of the non-contact handler 100 (e.g., near the end effector plate 204), the pressure differential created by the flow of fluid discharged by the end effector plate 204 is sufficient to cause the object 210 to be lifted toward the end effector plate 204.

Figure 3:
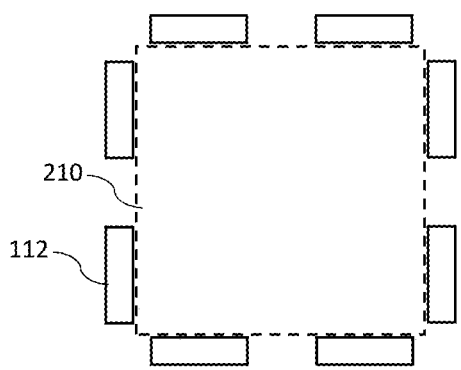
FIGS. 3 and 5 to 7 illustrate bottom plan views showing containment fence arrangements, relative to an object handled by non-contact handler shown in FIG. 1, which may be implemented according to some embodiments.

As mentioned above, conventional Bernoulli- and cyclone-type handlers can throw or spin an object away from the handler. However, in the non-contact handler 100, the plurality of containment fences 112 extend downwardly, below the effector surface 208, and are arranged so as to surround a periphery of the object 210 as it is lifted. The non-contact handler 100 may include at least two (e.g., two, three, four, five, six, seven, eight, etc.) containment fences 112 arranged so as to surround a periphery of the object 210 (e.g., four containment fences 112, arranged as exemplarily illustrated in FIG. 3) as it is lifted. Accordingly, when the object 210 is lifted toward the end effector plate 204, the object 210 (e.g., four containment fences 112) is lifted above a lower portion of the plurality of containment fences 112 and is thus prevented from being thrown or spun away from the non-contact handler 100. As shown in FIGS. 1 and 2, each of plurality of containment fences 112 includes an inclined guide surface 112a configured to engage with one or more edges of the object 210 as it is being lifted in the event that non-contact handler 100 is not perfectly aligned with the object 210 before it is lifted.

Figure 4:
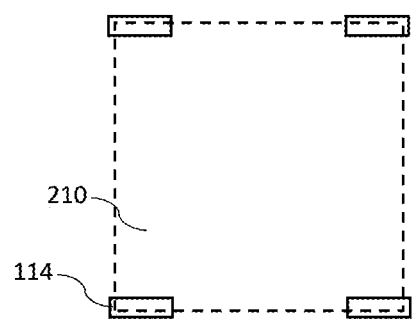
FIGS. 4 and 8 to 10 illustrate bottom plan views showing workpiece support arrangements, relative to an object handled by non-contact handler shown in FIG. 1, which may be implemented according to some embodiments.

As also mentioned above, conventional Bernoulli- or cyclone-type handlers can pick up an object such that the upward momentum of the object is sufficient to cause the upper surface of the object can contact the handler. However, in the non-contact handler 100, the plurality of workpiece supports 114 extend downwardly, below the effector surface 208, and have inclined surfaces 114a configured to contact edges of the upper surface of the lifted object 210 (and to not contact the upper surface thereof). Accordingly, when the object 210 is lifted toward the end effector plate 204, the upper surface of the object 210 is prevented from contacting any part of the non-contact handler 100. The non-contact handler 100 may include at least three (e.g., three, four, five, six, seven, eight, etc.) workpiece supports 114 (e.g., four workpiece supports 114, arranged as exemplarily illustrated in FIG. 4). The inclined surface 114a of each workpiece support 114 contacts an edge of the upper surface of the lifted object 210 along a line of contact in a range of 0.5-3 mm (e.g., 1.5 mm, or thereabout) in length. In the illustrated embodiment, each workpiece support 114 includes a workpiece support body portion 114b that can be fixed to the puck body 200 (e.g., by screws, pins, etc.). Generally, the material from which the workpiece supports 114 can contact the edge of the upper surface of the lifted object 210 with sufficient friction to minimize or prevent lateral movement of the lifted object 210. Accordingly the plurality of containment fences 112 may be omitted, provided that the non-contact handler 100 includes a plurality of the workpiece supports 114.

The plurality of containment fences 112 and the plurality of workpiece supports 114 may be formed of a polymeric material such as polyphenylene sulfide (PPS) (e.g., as sold under the trademark TECHTRON), polytetrafluoroethylene (PTFE) (e.g., as sold under the trademark TEFLON), or the like or any combination thereof. Generally, the material from which any containment fence 112 or workpiece support 114 is made can be selected based on its suitability to dissipate electro-static charges, chemical resistance, etc.

In the embodiment illustrated in FIG. 2, the first portion 206a of the effector passage is illustrated as extending only partially through the thickness of the end effector plate 204, such that the force of the pressurized fluid conveyed through the body passage 202 and into the effector passage is dispersed or diffused into the second portion 206b before being discharged from the end effector plate 204. In an alternative embodiment, however, the first portion 206a of the effector passage may extend completely through the thickness of the end effector plate 204 (e.g., so as to intersect the effector surface 208). In this alternative embodiment, some of the pressurized fluid conveyed through the body passage 202 and into the effector passage is transmitted through the end effector plate 204 directly from the first portion 206a (i.e., while avoiding the second portion 206b), while some of the pressurized fluid conveyed through the body passage 202 and into the effector passage is dispersed or diffused into the second portion 206b before being discharged from the end effector plate 204. As discussed below, transmitting some of the pressurized fluid through the end effector plate 204 directly from the first portion 206a (i.e., while avoiding the second portion 206b) can be beneficial when the object 210 to be lifted is perforated.

Often, the objects to be handled by the non-contact handler 100 are stacked upon each other in a common cassette or magazine. Sometimes a lifting force created by the aforementioned pressure differential created by the flow of fluid discharged from the end effector plate 204 is sufficient to lift multiple perforated objects 210 if the objects 210 are stacked upon (or otherwise very close to) one another. If the first portion 206a of the effector passage extends completely through the end effector plate 204 as discussed above, then the pressurized fluid transmitted through the end effector plate 204 (e.g., from the center of the effector surface 208) directly from the first portion 206a (i.e., while avoiding the second portion 206b) can beneficially be transmitted through the perforations in un upper object 210 to be lifted, and prevent objects 210 therebeneath from being lifted as well. It has been discovered that the ability to lift only the topmost perforated object 210 is enhanced if the lower body portion 104 does not include the plurality of workpiece supports 114. Generally, however, the inventors have discovered that, to avoid picking up multiple perforated objects 210, the air flow around the objects 210 should be disturbed while the objects 210 are under the influence of the lifting force created by the end effector plate 204, as the disturbance in the air flow around the perforated objects the uppermost perforated object 210 tends to cause the lower objects 210 to fall away from the non-contact handler 100.

It has also been discovered that, when the object 210 is perforated, the object 210 can undesirably vibrate when the non-contact handler 100 has lifted the perforated object 210 and the lifted object 210 is above a solid surface. In this case, the discharged fluid is transmitted through the perforated object 210, then hits the solid surface, then is retransmitted back through the perforated object 210 and reflects off of the components in the lower body portion 102 back onto the perforated object 210 to cause the vibration. To prevent or otherwise minimize this vibration, the plurality of workpiece supports 114 can be omitted.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention.

Figure 6:
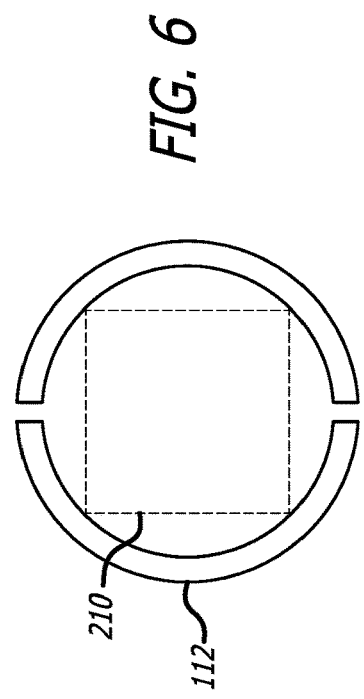
Figure 5:
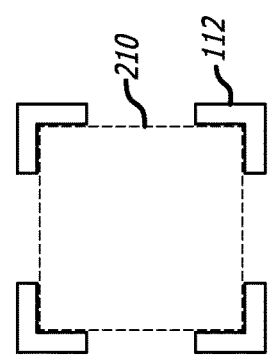
Figure 7:
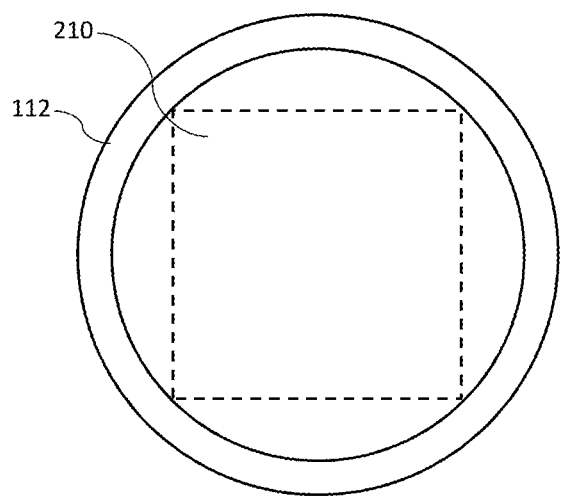

For example, each of the containment fences 112 have been described as a structure extending in a single direction along periphery of the object 210. In another embodiment, one or more of the containment fences 112 may extend in multiple directions along periphery of the object 210 (e.g., as exemplarily illustrated in FIG. 5 or 6). In another embodiment, the non-contact handler 100 may include a single containment fence 112 (e.g., configured as exemplarily illustrated in FIG. 7).

Figure 8:
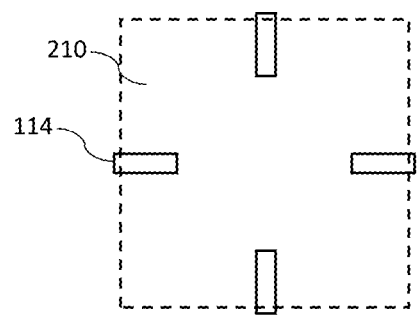
Figure 9:
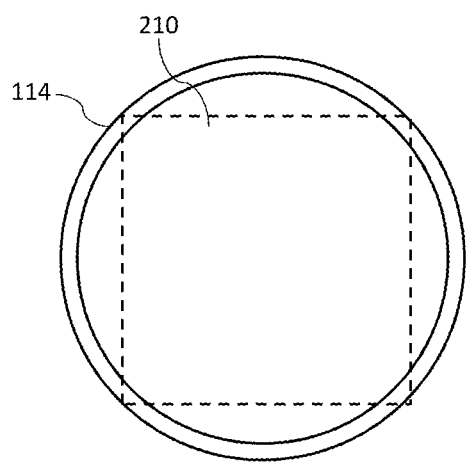
Figure 10:
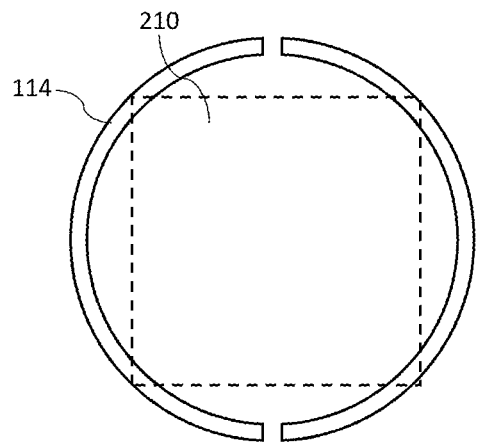

In another example, each of the workpiece supports 114 have been described as a linear structure arranged so as to contact the object 210 near corner regions thereof. In another embodiment, the workpiece supports 114 may be provided as linear structures arranged so as to contact the object 210 near side regions thereof (e.g., as exemplarily illustrated in FIG. 8). In other embodiments, one or more workpiece supports 114 may be provided as structures arranged so as to contact the object 210 at multiple discrete regions thereof (e.g., as exemplarily illustrated in FIG. 9 or 10).

In yet another example, although the guide surface 112a is illustrated as being inclined, it will be appreciated that the guide surface 112a may be configured differently (e.g., filleted).

Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:
1. A non-contact handler, comprising:
an upper body portion; and
a lower body portion movably coupled to the upper body portion by a plurality of spring-loaded pins configured to prevent the lower body portion from vibrating or moving undesirably, wherein the lower body portion includes:
- a non-contact puck configured to lift an object; and
- a plurality of containment fences extending downward from the puck, the plurality of containment fences arranged around a periphery of the object to be lifted.

2. The non-contact handler of claim 1, wherein the non-contact puck is a Bernoulli-type non-contact puck.

3. The non-contact handler of claim 1, wherein the non-contact puck is a cyclone-type non-contact puck.

4. The non-contact handler of claim 1, wherein at least one of the plurality of containment fences includes a guide surface configured to engage with an edge of the object to be lifted as the object is lifted.

5. The non-contact handler of claim 1, further comprising a workpiece support coupled to the non-contact puck, the workpiece support configured to contact an edge of the object to be lifted when the object is lifted by the non-contact puck.

6. The non-contact handler of claim 1, wherein the non-contact puck includes:
- a puck body having a body passage configured to receive an outlet end of a pressurized fluid source; and
- an end effector plate attached to the puck body, wherein the end effector plate includes an effector surface facing away from the puck body.

7. The non-contact handler of claim 6, wherein the end effector plate includes:
- an effector passage extending through the end effector plate, wherein the effector passage includes a first portion in fluid communication with the body passage and a second portion in fluid communication with the first portion and intersecting the effector surface.

8. The non-contact handler of claim 7, wherein the first portion of the effector passage extends through the end effector plate to intersect the effector surface.

9. The non-contact handler of claim 8, wherein the first portion of the effector passage extends through the end effector plate at a center of the effector surface.

10. A non-contact handler, comprising:
an upper body portion; and
a lower body portion movably coupled to the upper body portion, wherein the lower body portion includes:
- a non-contact puck configured to lift an object, wherein the non-contact puck includes:
  - a puck body having a body passage configured to receive an outlet end of a pressurized fluid source; and
  - an end effector plate attached to the puck body, wherein the end effector plate includes an effector surface facing away from the puck body, wherein the end effector plate includes:
    - an effector passage extending through the end effector plate, wherein the effector passage includes a first portion in fluid communication with the body passage and a second portion in fluid communication with the first portion and intersecting the effector surface; and
- a plurality of containment fences extending downward from the non-contact puck, the plurality of containment fences arranged around a periphery of the object to be lifted.

11. The non-contact handler of claim 10, wherein the first portion of the effector passage extends through the end effector plate to intersect the effector surface.

12. The non-contact handler of claim 11, wherein the first portion of the effector passage intersects a center of the effector surface.

* * * * *